United States Patent
Miyamoto

(10) Patent No.: US 7,711,240 B2
(45) Date of Patent: May 4, 2010

(54) REPRODUCING APPARATUS AND REPRODUCING METHOD

(75) Inventor: Harutoshi Miyamoto, Ibaraki (JP)

(73) Assignee: Panasonic Corporation, Osaka (JP)

( * ) Notice: Subject to any disclaimer, the term of this patent is extended or adjusted under 35 U.S.C. 154(b) by 963 days.

(21) Appl. No.: 10/584,751

(22) PCT Filed: Feb. 1, 2005

(86) PCT No.: PCT/JP2005/001406

§ 371 (c)(1),
(2), (4) Date: Jun. 27, 2006

(87) PCT Pub. No.: WO2005/076608

PCT Pub. Date: Aug. 18, 2005

(65) Prior Publication Data

US 2008/0193103 A1    Aug. 14, 2008

(30) Foreign Application Priority Data

Feb. 4, 2004    (JP)    ............... 2004-027638

(51) Int. Cl.
H04N 5/76    (2006.01)
(52) U.S. Cl. ............... 386/52; 386/125; 386/79; 386/111; 386/112
(58) Field of Classification Search ............... 386/79, 386/111, 112, 52, 125
See application file for complete search history.

(56) References Cited

U.S. PATENT DOCUMENTS

| | | | | |
|---|---|---|---|---|
| 5,867,634 | A | * | 2/1999 | Hirota et al. ............... 358/1.2 |
| 5,898,461 | A | * | 4/1999 | Ohsawa et al. ............... 375/240.12 |
| 6,259,825 | B1 | * | 7/2001 | Yamazaki ............... 382/276 |
| 6,360,057 | B1 | | 3/2002 | Tsumagari et al. |
| 2003/0020699 | A1 | * | 1/2003 | Nakatani et al. ............... 345/204 |
| 2003/0188182 | A1 | * | 10/2003 | Sato et al. ............... 713/193 |

FOREIGN PATENT DOCUMENTS

| | | |
|---|---|---|
| JP | 7-030838 | 1/1995 |
| JP | 2000-322875 | 11/2000 |
| JP | 2003-289495 | * 10/2003 |
| JP | 2004-005344 | 1/2004 |
| WO | 03/091908 | 6/2003 |

OTHER PUBLICATIONS

Supplementary European Search Report issued Apr. 29, 2009 in EP 05 70 9552, which is a foreign counterpart to the present application.
Office Action mailed Aug. 25, 2009 in corresponding European Patent Application No. 05709552.3.
English Translation of JP 2003-289495 (translation performed Apr. 28, 2009).

* cited by examiner

Primary Examiner—Thai Tran
Assistant Examiner—Helen Shibru
(74) Attorney, Agent, or Firm—Wenderoth, Lind & Ponack, L.L.P.

(57)    ABSTRACT

A reproducing apparatus enabling reproduction of a moving image file using index information larger than a memory size without re-reading the index information into the memory. The apparatus includes a table size obtaining unit (S40) obtaining, from a recording medium, size information of a table which holds index information for the moving image file, a memory storing index information, a memory size obtaining unit (S42) obtaining size information of the memory, and a calculating unit (S41) calculating the thinning-out ratio of the index information so that the size of the table becomes equal to or smaller than the size of the memory. The apparatus also includes a thinning-out unit (S44) thinning out the index information based on the thinning-out ratio, and a writing unit (S45) writing the thinned-out index information into the memory.

8 Claims, 14 Drawing Sheets

FIG. 3

```
Index              :0001
Reproduction time  :0000   msec       ─── 100
Chunk offset       :0000   Bytes Index              :0002
Reproduction time  :0500   msec       ─── 101
Chunk offset       :0120   Bytes Index              :0003              ─── 102
Reproduction time  :1000   msec       ─── 103
Chunk offset       :0400   Bytes      ─── 104

.
         .
         .

Index              :0010
Reproduction time  :4500   msec
Chunk offset       :1830   Bytes

.
         .
         .
```

FIG. 6
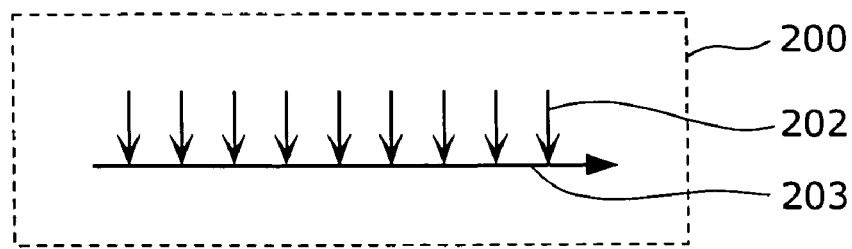
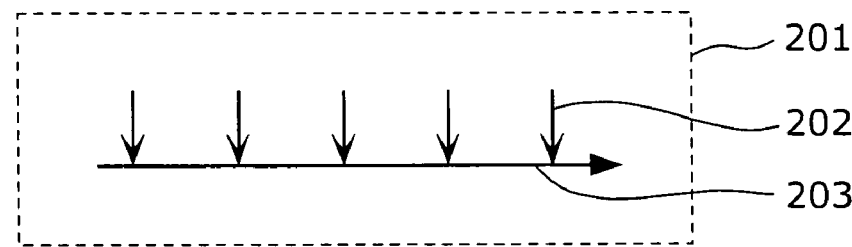
FIG. 7
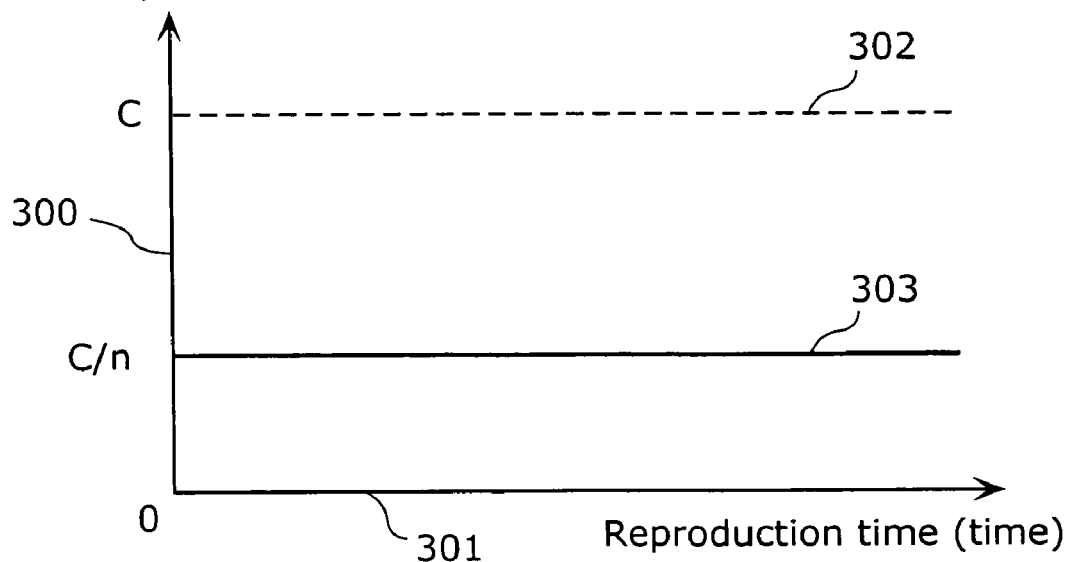

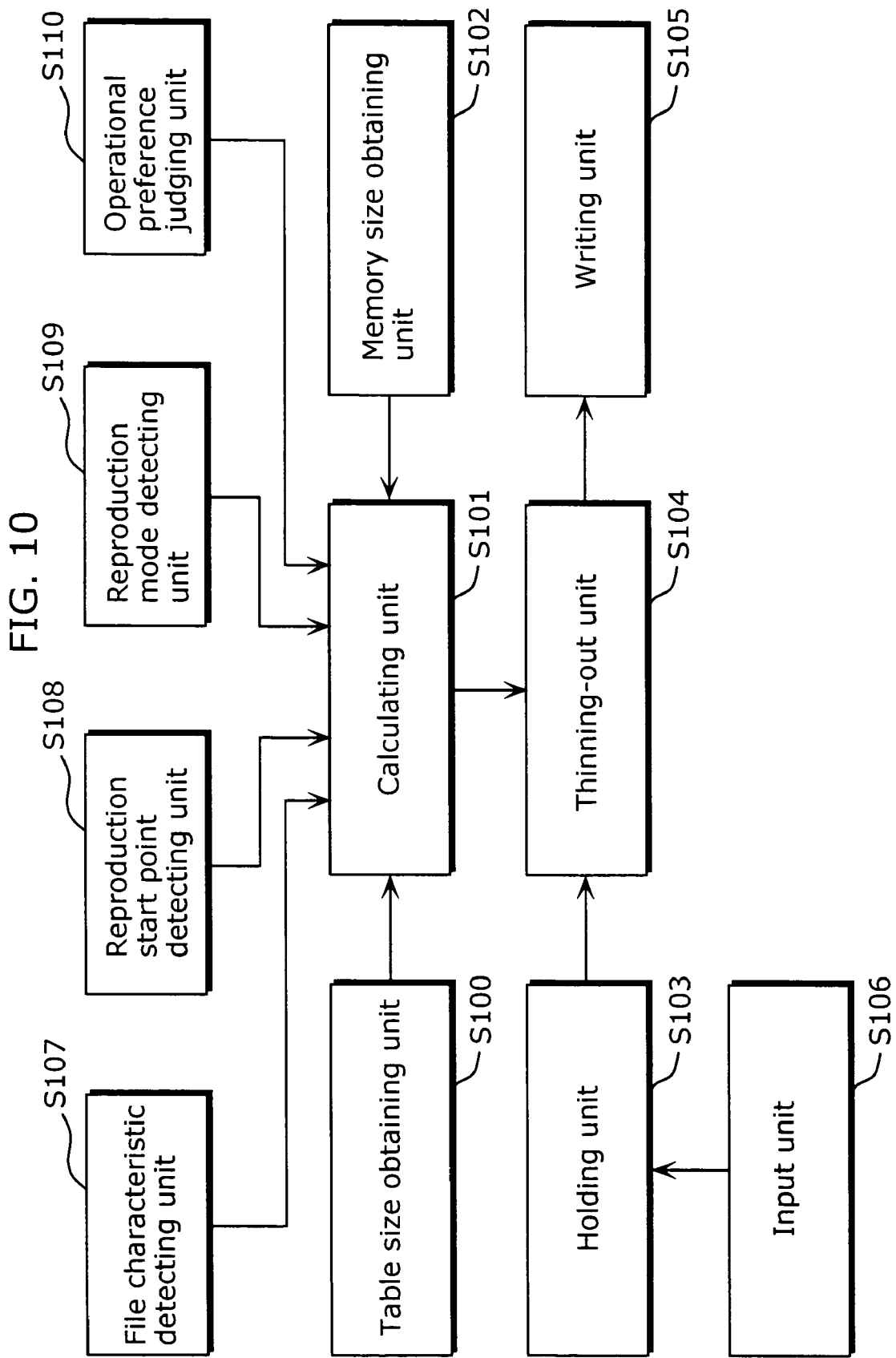

REPRODUCING APPARATUS AND REPRODUCING METHOD

BACKGROUND OF THE INVENTION

1. Field of Invention

The present invention relates to an apparatus which reproduces moving image files using index information.

2. Description of the Related Art

Some of the moving image files which are recorded and reproduced by a recording/reproducing apparatus such as a personal computer and a video recorder/video player have index information indicating the structures of their contents (See, for example, Patent Reference 1). Index information indicates, as for a chunk, a packet, a frame or the like in a moving image file, the relations between its position information and time information, its position information and marker information indicating its arbitrary reproduction point, and the like.

The reproducing apparatus uses such index information in order to determine the point in data at which data transfer to a decoder starts, when it starts reproduction in the middle of a file specified with time or position or when it makes intermittent reproduction of the file such as fast-forward and fast-backward reproduction. Without using index information, the reproducing apparatus may expose its functional limitations such that it spends much time to find a target point in data or it is unable to find the target point, under some specifications or restrictions of the decoder and the system. Therefore, good use of index information is of importance in reproducing moving image files.

Patent Reference 1: Japanese Laid-Open Patent Application No. 07-30838 Publication Patent Reference JP 2003-289495 A discloses a method directed to solving the problem that an entry exceeding a capacity of a storage permissible entry field cannot be stored when writing, onto a memory, index information for a moving image file to be recorded.

BRIEF SUMMARY OF THE INVENTION

Initially, it is noted that it is normal for index information to be recorded all over a moving image file. Therefore, data size of index information for a file of long reproduction time such as a moving image file tends to increase significantly. Conventionally, since many of moving image files are assumed to be reproduced in a system of large memory resources such as a personal computer, their large data size has not been a serious problem in reading the index information as far as they are reproduced in such personal computer.

However, an inexpensive reproducing apparatus of small memory resources such as a DVD video player has a disadvantage of inability to read the whole index information into its memory. This disadvantage is a major obstacle to the cases where quick operations are required for reproduction of a moving image file, in particular for fast-forward or fast-backward reproduction of the moving image file. To be more specific, in the case where a moving image file recorded in a medium, such as an optical disk, in which it takes a relatively long time to read data, is reproduced, if there is no necessary index information in the memory, it is necessary to temporarily stop the reproduction and read the unobtained index information from the optical disk, during which a problem such as a stop of a reproduction operation occurs.

As mentioned above, when a reproducing apparatus with a small capacity memory reproduces a moving image file with index information of large data size, there occurs a problem that such reproducing apparatus is unable to read all the index information as it is at once. Particularly in recent years, such problem has gotten attention partly because it is difficult to incorporate a large capacity memory into consumer audio and video equipment, such as a DVD recorder and a DVD player which have come into wide use rapidly, due to cost reduction, and only a small capacity memory can be incorporated therein.

The present invention has been conceived in view of these problems, and an object of the present invention is to provide a reproducing apparatus which is capable of reproducing a moving image file using larger index information in size than a memory size, without re-reading the index information into the memory.

In order to achieve the above object, the reproducing apparatus according to the present invention is an apparatus which reproduces a moving image file. Specifically, the apparatus includes a table size obtaining unit operable to obtain, from a recording medium, size information of a table which holds index information for the moving image file, a memory for storing index information, a memory size obtaining unit operable to obtain size information of the memory, a calculating unit operable to calculate a thinning-out ratio of the index information so that the size of the table becomes equal to or smaller than the size of the memory, a thinning-out unit operable to thin out the index information based on the thinning-out ratio, and includes a writing unit operable to write the thinned-out index information into the memory. This allows even a reproducing apparatus with a memory of minimum capacity to read the whole index information without losing the positional accuracy of its reproduction point. Accordingly, there is no need to re-read the index information, and therefore fast reproduction operations can be realized.

Here, the calculating unit may calculate the thinning-out ratio of the index information so that the index information is thinned out at regular intervals with respect to a total reproduction time of the moving image file. Alternatively, the calculating unit may calculate the thinning-out ratio of the index information so that the index information is thinned out based on a weight assigned to the index information depending on a reproduction time of the moving image file. There are the following methods for thinning out the index information according to the weight assigned thereto.

For example, the reproducing apparatus may further include a file characteristic detecting unit operable to detect a characteristic of the moving image file, and in the case where the file characteristic detecting unit detects that the contents of the moving image file is a movie, the calculating unit may calculate the thinning-out ratio of the index information so that the density of the index information becomes lower as the reproduction time of the moving image file passes. This makes the density of the index information lower as the reproduction time of the moving image file passes, and therefore it becomes possible to minimize the decrease in positional accuracy of the reproduction point caused by the thinning-out.

Furthermore, the reproducing apparatus may include a reproduction start point detecting unit operable to detect a reproduction start point of the moving image file, and the calculating unit may calculate the thinning-out ratio of the index information so that the density of the index information becomes lower before the reproduction start point detected by the reproduction start point detecting unit, and the density of the index information becomes higher after the reproduction start point detected by the reproduction start point detecting unit. This makes the density of the index information lower before the reproduction start point of the moving image file and higher after the reproduction start point. Accordingly, it becomes possible to minimize the decrease in positional accuracy of the reproduction point caused by the thinning-out.

In addition, the reproducing apparatus may include a reproduction mode detecting unit operable to detect a reproduction mode of the moving image file, and in the case where the reproduction mode detecting unit detects an introduction reproduction mode for searching for the beginning of the moving image file, the calculating unit may calculate the thinning-out ratio of the index information so that the density of the index information becomes higher in an introduction reproduction section, and the density of the index information becomes lower in a section other than the introduction reproduction section. This makes the density of the index information higher in the introduction reproduction section, and lower in a section other than the introduction reproduction section, and therefore makes it possible to minimize the decrease in positional accuracy of the reproduction point caused by the thinning-out.

Moreover, the reproducing apparatus may include an operational preference detecting unit operable to detect an operational preference of a user, and in the case where the operational preference detecting unit detects that the user uses a specific reproduction function with a predetermined frequency or higher, the calculating unit may calculate the thinning-out ratio of the index information so that the density of the index information becomes higher in a reproduction section which is required when the reproduction function is used, and the density of the index information becomes lower in a reproduction section which is not required when the reproduction function is used. This makes the density of the index information higher in the reproduction section which is required when a specific reproduction function is used, and lower in the reproduction section which is not required when such reproduction function is used, in the case where the user uses the specific reproduction function with a predetermined frequency or higher. Therefore, it becomes possible to minimize the decrease in positional accuracy of the reproduction point caused by the thinning-out.

Here, the reproducing apparatus may include a selecting unit operable to selectively cause one of the following units to operate: the file characteristic detecting unit; the reproduction start point detecting unit; the reproduction mode detecting unit; and the operational preference detecting unit. This allows easy selection of any one of the file characteristic detecting unit, the reproduction start point detecting unit, the reproduction mode detecting unit and the operational preference detecting unit.

Furthermore, the reproducing apparatus may include a reproducing unit operable to reproduce the moving image file, and the calculating unit may calculate a reproduction start point of the moving image file based on the thinning-out ratio, and the reproducing unit may reproduce the moving image file from the reproduction start point. This allows normal reproduction of a moving image file using thinned-out index information.

Note that not only it is possible to embody the present invention as the reproducing apparatus as described above, but also as an information presentation method that includes, as its steps, the characteristic units included in such reproducing apparatus, and as a program causing a computer to execute such steps. It should be also noted that such program can be distributed on a recording medium such as a CD-ROM and over a transmission medium such as the Internet.

As is obvious from the above description, the reproducing apparatus according to the present invention is capable of reading the whole index information without losing the positional accuracy of the reproduction point more than necessary by thinning out the index information table of large data size at regular intervals, even if it has only a memory of minimum capacity. This avoids the need to re-read the index information, and therefore fast-reproduction operations can be realized.

Thinning out index information according to the weight assigned thereto makes it possible not only to realize fast reproduction operations but also to minimize the decrease in positional accuracy of the reproduction point caused by the thinning-out.

Accordingly, the present invention allows reproduction of a moving image file using index information of larger size than a memory size without re-reading the index information into the memory, and therefore the practical value of the present invention is extremely high today because an inexpensive reproducing apparatus with a minimum memory has come into wide use. There is also another effect that the present invention can be embodied with software control schemes without requiring any special hardware change.

BRIEF DESCRIPTION OF DRAWINGS

FIG. 3 is a diagram showing a structure example of index information before it is thinned-out.

FIG. 6 is a diagram conceptually showing a method for thinning out index information to one nth (1/n) at regular intervals.

FIG. 7 is a diagram showing a state of index information in the case where it is thinned out at regular intervals.

FIG. 10 is a functional block diagram of the main parts of a reproducing apparatus in a second embodiment.

DETAILED DESCRIPTION OF THE INVENTION

The following describes embodiments of the present invention with reference to the drawings.

First Embodiment

Figure 1:
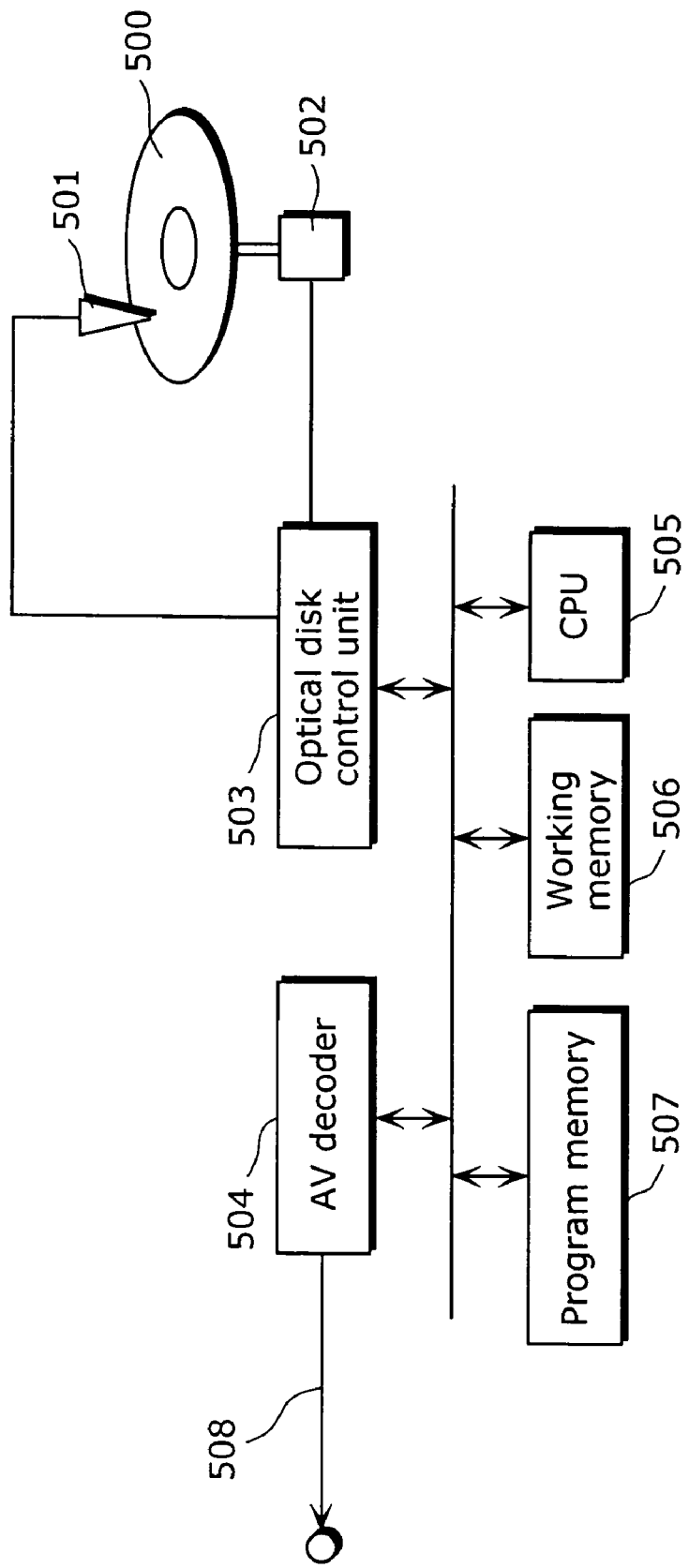
FIG. 1 is a hardware structure diagram of an optical disk reproducing apparatus to which the present invention is applied.

FIG. 1 is a hardware structure diagram of an optical disk reproducing apparatus to which the present invention is applied. In the present embodiment, a DVD player which is capable of reproducing a digital versatile disc (DVD) is described as one example of such optical disk reproducing apparatus. However, the present invention is not limited to such DVD player and is applicable to any equipment capable of reproducing a moving image file.

An optical disk 500 is a recording medium on which at least a moving image file and index information are recorded. In the present embodiment, which describes a DVD player as one example of an optical disk reproducing apparatus, the optical disk 500 here is equivalent to a DVD player.

However, there is no limitation of the form and the recording type of the recording medium if it is a recording medium on which at least a moving image file and index information are recorded. Such recording medium may take a form of a hard disk drive, a semiconductor memory such as a memory card, or the like, and may take a magnetic or electric type recording other than optical type recording.

An optical pickup 501 reads a signal recorded on the optical disk 500 by irradiating laser light on the recording surface of the optical disk 500 using laser diode (not shown in the diagram) and reading the light reflected from the recording surface of the optical disk. In the present embodiment, all that the optical pickup 501 needs to do is to read the signal recorded on the optical disk 500, but it may have a function of recording a signal on the optical disk 500.

A spindle motor 502 rotates the optical disk 500 at a predetermined rotation speed. A supporting unit such as a turntable or a damper (both of which are not shown in the diagram) is used to support the optical disk 500. To be more specific, the optical disk is supported on a turntable and the turntable is rotated.

An optical disk control unit 503 controls the optical pickup 501 so that it reads a signal from the optical disk 500. The optical disk control unit 503 also controls the spindle motor 502 so that it rotates the optical disk 500 at a predetermined rotation speed. The optical disk control unit 503 further converts the signal read by the optical pickup 501 into digital information.

An AV decoder 504 is a decoding unit for decoding a moving image file read from the optical disk 500, into a video signal which can be displayed on a display device such as a television receiver.

A CPU 505 is a central processing unit for performing processing of various kinds of signals based on the program codes stored in a program memory 507. It is capable of performing processing of moving image files and index information stored in a working memory 506 and analyzing them. The processing of index information is described later with reference to FIG. 2.

The working memory 506 temporarily holds various kinds of data such as moving image files and index information, and performs signal processing along with the CPU 505. The program memory 507 stores program codes for executing the signal processing to be performed by the CPU 505. An audio/video signal 508 is outputted from the reproducing apparatus and outputted to another equipment (such as a television receiver) connected to the reproducing apparatus.

Figure 2:
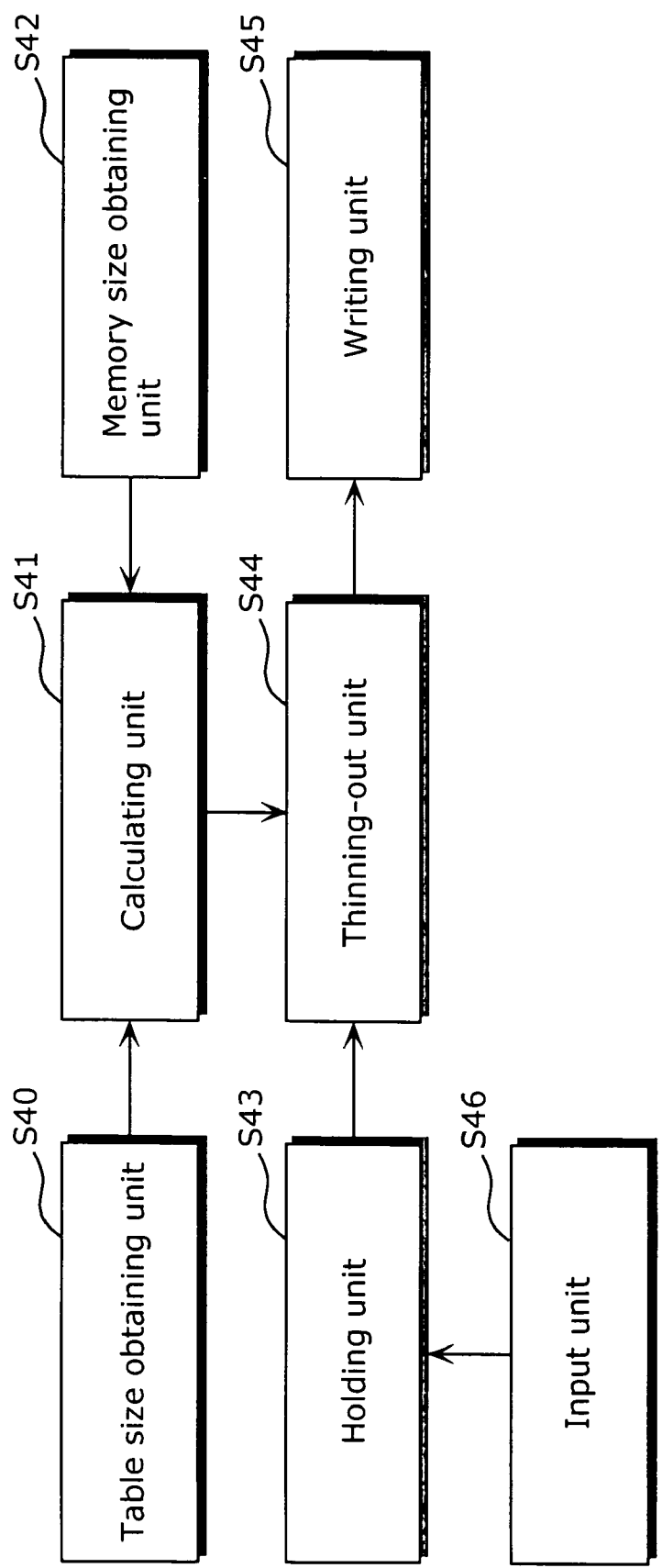
FIG. 2 is a functional block diagram of the main parts of the optical disk reproducing apparatus to which the present invention is applied.

FIG. 2 is a functional block diagram of the main parts of the optical disk reproducing apparatus to which the present invention is applied, and more specifically, it shows the functions realized by the CPU 505 in FIG. 1. This optical disk reproducing apparatus includes, in a functional sense, a table size obtaining unit S40, a calculating unit S41, a memory size obtaining unit S42, a holding unit S43, a thinning-out unit S44 and a writing unit S45.

The table size obtaining unit S40 obtains the size information (to be described later) of an original (hereinafter referred to as "pre-thinned-out") index information table. The calculating unit S41 calculates a thinning-out ratio of index entries (to be described later). The memory size obtaining unit S42 obtains the size information of an index information table memory (working memory 506) into which the thinned-out index entries are to be stored. The holding unit S43 is a buffer for holding the pre-thinned-out index entries. The thinning-out unit S44 thins out the index entries held in the holding unit S43 based on the result of the calculation by the calculating unit S41. The writing unit S45 writes the index entries thinned out by the thinning-out unit S44 into the working memory 506. The input unit S46 inputs the pre-thinned-out index entries into the reproducing apparatus.

FIG. 3 is a diagram showing a structure example of index information before it is thinned out. As shown in this FIG. 3, the index information is stored in the index information table 100, and consists of two or more index entries 101. More specifically, each index entry 101 is the unit that is one of the subdivisions of index information, and a set of index entries 101 is equivalent to the index information. An index number 102 included in the index entry 101 is a number for identifying each index entry 101. A reproduction time 103 denotes a time point specified by the index entry 101, and a chunk offset 104 denotes a chunk location specified by the index entry 101.

Figure 4:
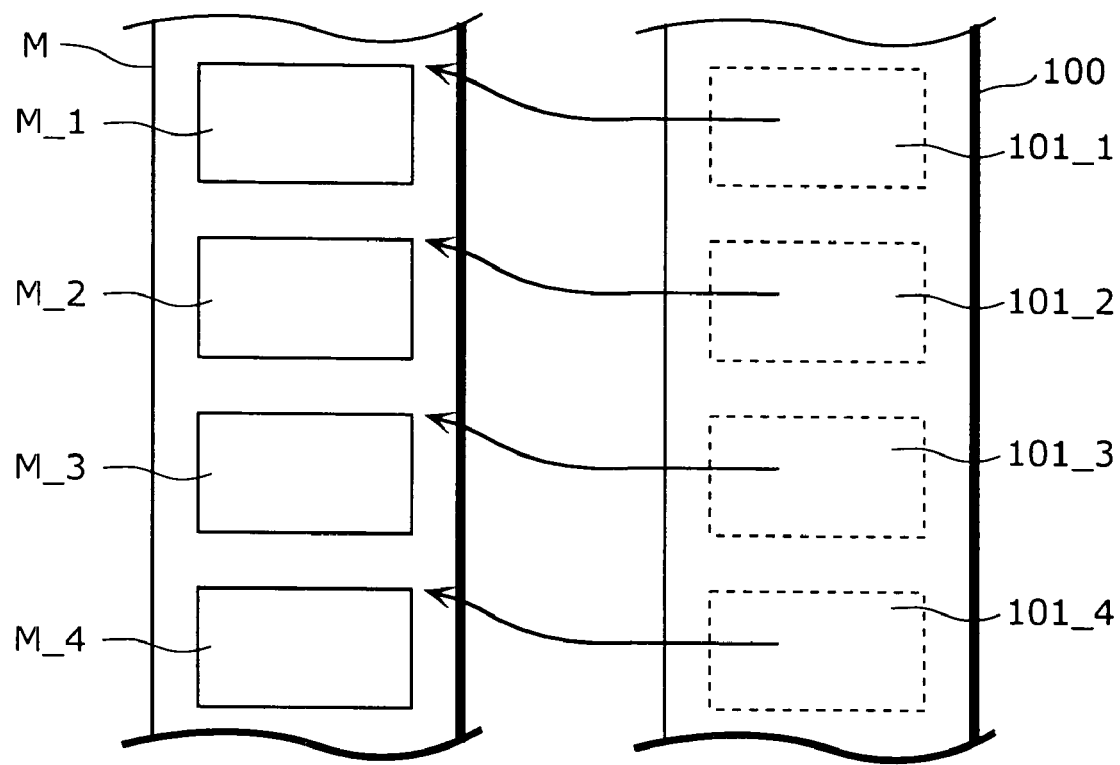
FIG. 4 is a diagram conceptually showing the relation between chunks and chunk offsets.

FIG. 4 is a diagram conceptually showing the relation between chunks and chunk offsets. As shown in FIG. 4, each of the chunks M_1 to M_4 is one of the units which make up a moving image file M. The chunk offset included in each of the index entries 101_1 to 101_4 represents the location of each chunk M_1 to M_4 using the number of bytes from a predetermined position in the moving image file M.

Figure 5:
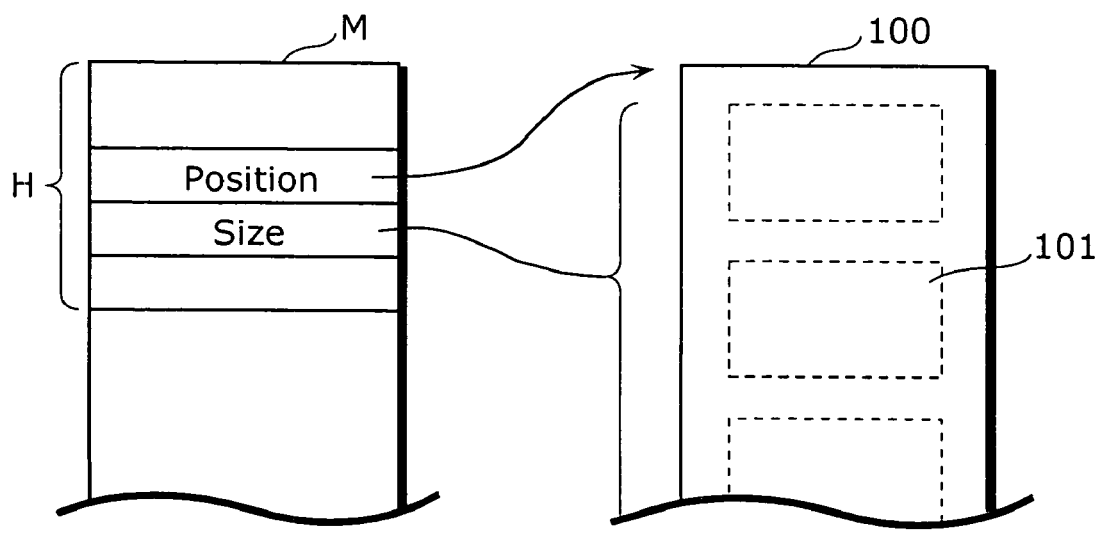
FIG. 5 is a diagram conceptually showing the relation between a moving image file and an index information table.

FIG. 5 is a diagram conceptually showing the relation between a moving image file and an index information table. As shown in this FIG. 5, in the header H of the moving image file M, the starting position information of the index information table 100 in the moving image file M, the size information of the index information table 100 and the like are stored.

FIG. 6 is a diagram conceptually showing a method for thinning out the index information to 1/n at regular intervals, and here it shows, with an example, a thinning-out method in the case of n=2. 200 denotes a pre-thinned-out index information table, 201 denotes a post-thinned-out index information table, and 202 denotes an index entry set in a predetermined interval such as every chunk interval. 203 denotes the reproduction time axis of a moving image file indicated by the index entries 202. As shown in this FIG. 6, the data size of the post-thinned-out index information table 201 is smaller than that of the pre-thinned-out index information table 200.

FIG. 7 is a diagram showing a state of index information in the case where it is thinned out at regular intervals. 300 denotes the density (pieces per time) of index entries, 301 denotes the reproduction time (time) of a moving image file, 302 denotes the density C of index entries in the pre-thinned-out index information table, and 303 denotes the density C/n of index entries in the post-thinned-out index information table.

The operation of the optical disk reproducing apparatus structured as mentioned above is described below with reference to FIG. 1.

First, based on the reproduction instruction from the user, the optical disk control unit 503 controls the spindle motor 502 so that it rotates the optical disk 500 at a predetermined rotation speed, and controls the optical pickup 501 so that it reads a signal (such as a moving image file and index information) recorded on the optical disk 500. The signal read by the optical pickup 501 is converted into digital information by the optical disk control unit 503, and temporarily stored in the working memory 506. At this time, the information read from the optical disk 500 is only a part of the moving image file data, considering a small capacity of the working memory 506.

The CPU 505 reads only the index information out of the information stored in the working memory 506 as mentioned above, and perform the analysis processing of this index information. Specific processing operations will be described later with reference to FIG. 2.

Next, the CPU 505 stores the result of its analysis of the index information, as management information, into the working memory 506. The stream data of the moving image file read from the optical disk 500 is transferred to the AV decoder 504 based on the management information stored in this manner. Then, the AV decoder 504 decodes the inputted stream data into moving image data and outputs it, as an audio/video signal 508, to external equipment (such as a television receiver).

By repeating the above operations, the moving image file recorded on the optical disk 500 is reproduced.

Next, the operation for thinning out index information is described.

In FIG. 6, in the case where the size of the pre-thinned-out index information table 200 is larger than the memory size of the working memory 506 into which the index information table 201 is to be stored, the present invention gives its advantage. More specifically, the index entries 202 are thinned out at regular intervals as the reproduction time 203 goes by so that the size of the index information table 201 becomes 1/n the original one, so that it becomes possible for even a reproducing apparatus including only a minimum memory to read the whole index information.

FIG. 7 shows that the density of the post-thinned-out index entries 303 decreases to a density C/n, while that of the pre-thinned-out index entries 302 is a density C. Since they are thinned out at regular intervals as the reproduction time 301 passes in the first embodiment, the density distribution of the index entries in FIG. 7 is parallel to the axis of the reproduction time 301.

Figure 8:
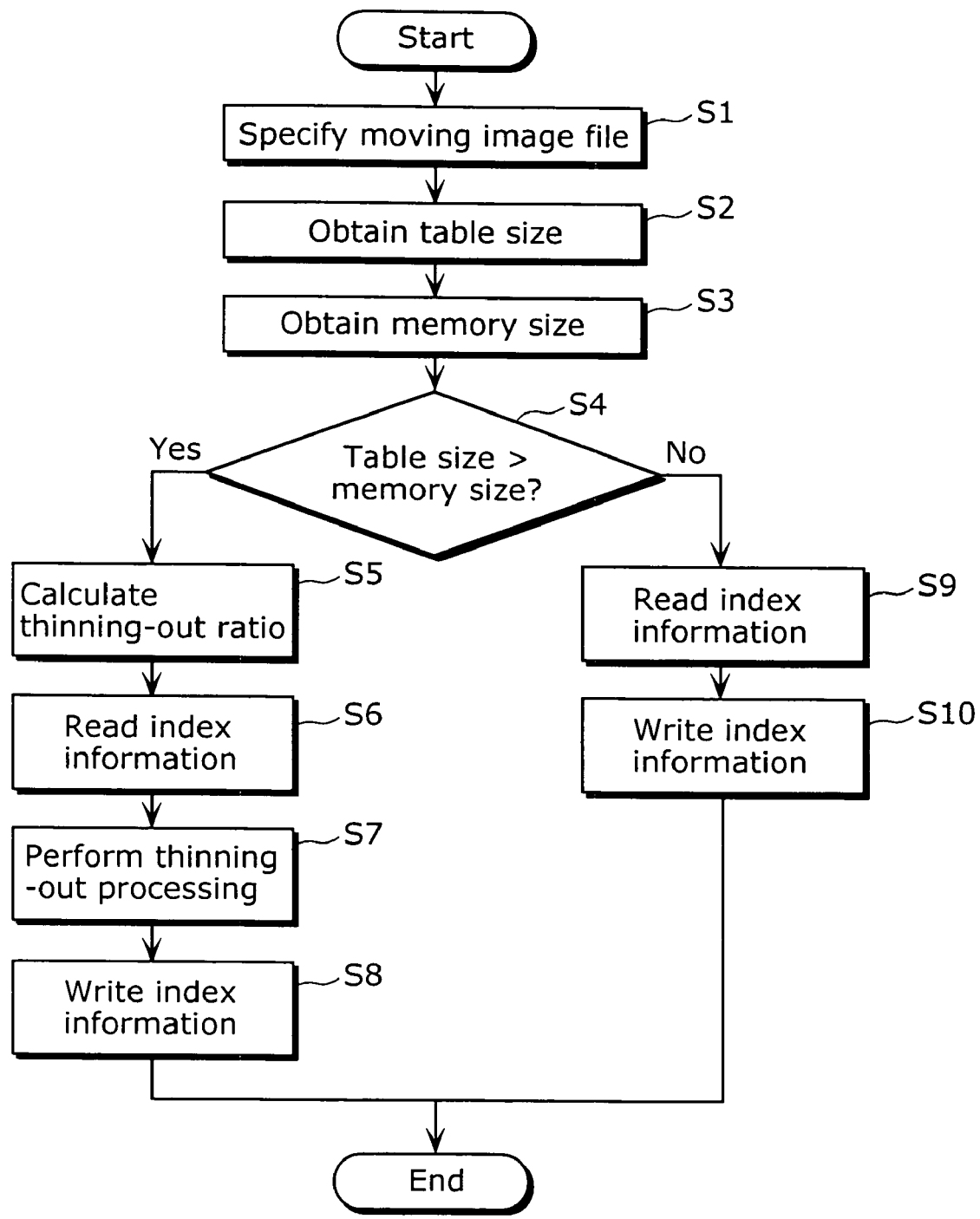
FIG. 8 is a flowchart showing thinning-out operation by the reproducing apparatus to which the present invention is applied.

FIG. 8 is a flowchart showing the thinning-out operation by the reproducing apparatus to which the present invention is applied. The thinning-out operation of this reproducing apparatus will be described below with reference to FIG. 8 and FIG. 2.

First, the user specifies a moving image file to be reproduced, the table size obtaining unit S40 obtains the size information of the index information table from the moving image file, a part of which is stored in the working memory 506 (from S1 to S2). As already described, the size information of the index information table can be obtained by referring to the header of the moving image file.

In parallel to the operation for obtaining the table size information as mentioned above, the memory size obtaining unit S42 obtains the size information of the working memory 506 for storing the index information table (S3). This means that the memory size obtaining unit S42 obtains the size information of the area allocated for storing the index information table, in the case where not only the index information table but also other information is stored in this working memory 506.

Here, in the case where the size of the index information table is larger than that of the working memory 506, the calculating unit S41 calculates the thinning-out ratio of index entries for making the size of this table equal to or smaller than that of the working memory 506 (Yes in S4, and to S5). This "calculating the thinning-out ratio" specifically means a calculation of the value of n in FIG. 6. It should be noted that no thinning-out processing is performed in the case where the size of the index information table is smaller than that of the working memory 506 (No in S4), such that if the table size is not larger than the memory size, the index information is simply read (S9) and then written to the working memory 506 (510).

On the other hand, the input unit S46 obtains the location information of the index information on the optical disk from the moving image file stored in the working memory 506. As already described, the location information of the index information can be obtained by referring to the header of the moving image file. After obtaining the location information of the index information in this manner, the input unit S46 starts reading out the index entries from this location (S6) and stores them into the holding unit S43 (to be described later).

The index entries stored in the holding unit S43 are inputted into the thinning-out unit S44, and thinned out based on the value n calculated by the calculating unit S41 (S7). To be more specific, as shown in FIG. 6, the thinning-out unit S44 thins out the index entries 202 in the pre-thinned-out index information table 200 to 1/n (n=2 in the example of FIG. 6) so that the number of index entries 202 in the post-thinned-out index information table 201 is decreased to 1/n the original one. Here, as shown in FIG. 7, the density 303 of the post-thinned-out index entries is assumed to be constant at C/n in the time axis direction.

After the index entries are thinned out in this manner, the writing unit S45 writes the post-thinned-out index entries into the working memory 506 (S8).

FIG. 9 is a diagram conceptually showing thinning-out processing at a ratio of 1/n (n=2). Here, in order to simplify the description, it is assumed that both holding unit S43 and the working memory 506 have a storage size for storing only five index entries, respectively, in the case where the index information consists of ten index entries 101_1 to 101_10.

Figure 9A:
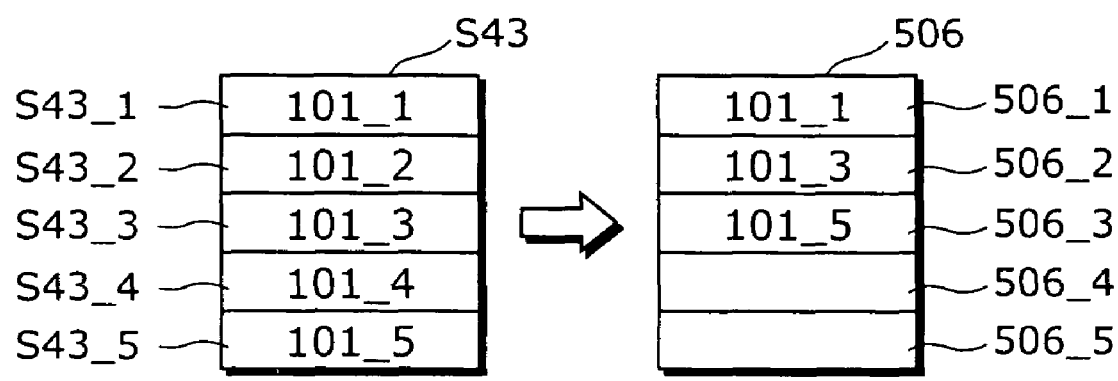
FIG. 9 is a diagram conceptually showing thinning-out processing at a ratio of 1/n (n=2).

First, as shown in FIG. 9A, after the index entries 101_1 to 101_5 are read from the optical disk, they are respectively stored in the areas S43_1 to S43_5 in the holding unit S43. The index entry 101_1 stored in the area S43_1 is written in the area 506_1 in the working memory 506, the index entry 101_3 stored in the area S43_3 is written in the area 506_2 in the working memory 506, and the index entry 101_5 stored in the area S43_5 is written in the area 506_3 in the working memory 506.

Figure 9B:
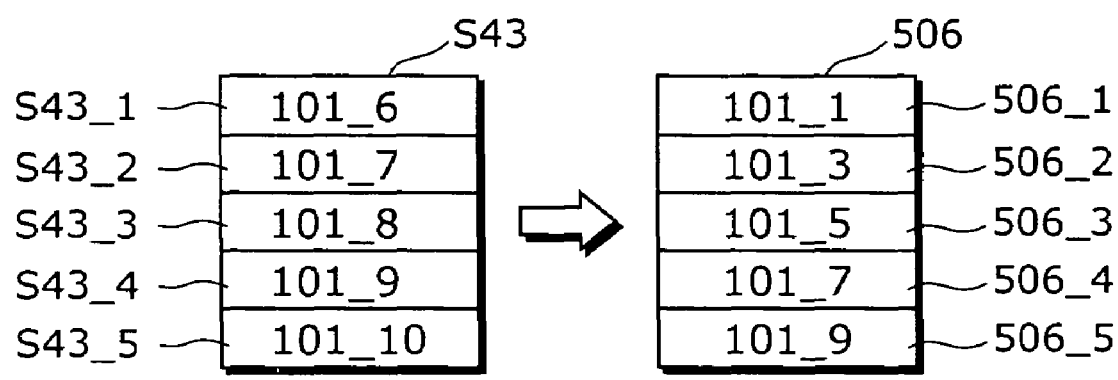

Next, as shown in FIG. 9B, after the index entries 101_6 to 101_10 are read from the optical disk, they are respectively stored in the areas S43_1 to S43_5 in the holding unit S43. The index entry 101_7 stored in the area S43_2 is written in the area 506_4 in the working memory 506, and the index entry 101_9 stored in the area S43_4 is written in the area 506_5 in the working memory 506.

As described above, in the case where ten index entries 101_1 to 101_10 are thinned out to 1/n (n=2), five index entries 101_1, 101_3, 101_5, 101_7 and 101_9 are respectively written into the areas 506_1, 506_2, 506_3, 506_4 and 506_5 in the working memory.

As described above, according to the present embodiment, it becomes possible for even a reproducing apparatus with a minimum memory to read the whole index information without losing the positional accuracy of the reproduction point more than necessary, by thinning out the index information table of large data size at regular intervals. Accordingly, the reproducing apparatus does not need to re-read the index information, and therefore fast reproduction operation can be realized.

Second Embodiment

In the first embodiment, the structure for thinning out index information at regular intervals has been described. In the second embodiment, the structure for thinning out the index information based on the weight assigned to such index information.

FIG. 10 is a functional block diagram of the main parts of the reproducing apparatus in the second embodiment. Since the table size obtaining unit S100, the memory size obtaining unit S102, the holding unit S103, the thinning-out unit S104, the writing unit S105, the input unit S106 are same as those in the above first embodiment, a detailed description thereof is not repeated here. The file characteristic detecting unit S107, the reproduction start point detecting unit S108, the reproduction mode detecting unit S109, the operational preference detecting (judging) unit S110 and the calculating unit S101 are described below.

The file characteristic detecting unit S107 detects the file characteristic of a moving image file to be reproduced. The reproduction start point detecting unit S108 detects the reproduction start point of a moving image file to be reproduced. The reproduction mode detecting unit S109 detects the reproduction mode of the reproducing apparatus when it reproduces a moving image file. The operational preference detecting unit S110 detects the operational preference specific to a user of the reproducing apparatus. The calculating unit S101 calculates the thinning-out ratio of index entries based not only on the information obtained from the table size obtaining unit S100 and the memory size obtaining unit S102 but also on the information obtained from the file characteristic detecting unit S107, the reproduction start point detecting unit S108, the reproduction mode detecting unit S109 or the operational preference detecting unit S110. Each of these units can be embodied when the CPU 505 in FIG. 1 executes the program.

Each of the file characteristic detecting unit S107, the reproduction start point detecting unit S108, the reproduction mode detecting unit S109 and the operational preference detecting unit S110 is described below in more detail.

[Characteristic of Moving Image File]

Figure 11:
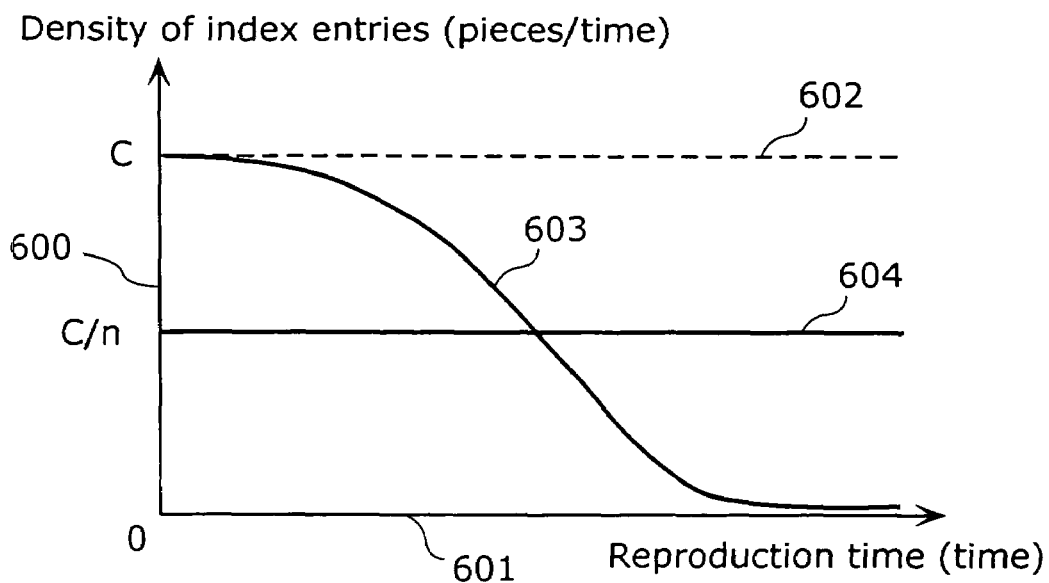
FIG. 11 is a diagram showing a state of index information in the case where it is thinned out based on a characteristic of a moving image file.

FIG. 11 is a diagram showing a state of index information in the case where it is thinned out based on the characteristic of a moving image file. To be more specific, a moving image file is assumed to be a movie in this case, because the total time required for reproducing the whole file from the beginning is about 90 to 180 minutes. FIG. 11 shows the state in which the reproducing apparatus is reading index information while thinning out the index information based on the weight assigned thereto depending on the characteristic of the file.

In FIG. 11, 600 denotes the density (pieces per time) of index entries, 601 denotes the reproduction time (time) of the moving image file, 602 denotes the density C of the index entries in the pre-thinned-out index information table, 603 denotes the distribution of the densities of the index entries which were thinned out based on the weights assigned thereto, and 604 denotes the average value of the densities in the distribution indicated by 603.

The operation of the optical disk reproducing apparatus structured as mentioned above will be described below.

First, since the basic reproduction operation of the optical disk is same as that of the first embodiment, the description thereof is not repeated here. Here, it is assumed that a movie or the like which takes a long time to be reproduced in full is reproduced. In this case, the density of the index entries is not maintained constant in the time axis direction, differently from the above first embodiment, but as shown in FIG. 11, the density is changed in the time axis direction so that the density of the index entries becomes high or no entry is thinned out around the beginning of the moving image file, and the density decreases as the file comes to the end.

Since a fast-forward operation using index information is usually used to search for or identify the target reproduction start point of a moving image file when a user wants to see the file in the middle thereof, the positional accuracy in the latter part of the moving image file may be lower than the first part thereof.

Using these characteristics, the file characteristic detecting unit S107 detects the reproduction time information of the whole moving image file recorded on an optical disk when reproducing the optical disk. In the case where the detected total reproduction time is a predetermined time or longer (for example, 90 to 180 minutes), it judges that the moving image file recorded on the optical disk is a movie and controls, based on the characteristic diagram of FIG. 11, how much index information should be thinned out by the CPU 505. More specifically, in the case where a moving image file to be reproduced is a long-time moving image file such as a movie, the CPU 505 performs a unique weight-based thinning-out as indicated by 603 in FIG. 11. It becomes possible to store all of the post-thinned-out index entries into the working memory 506 of the reproducing apparatus, by adjusting the thinning-out rate so that the value of 604 is maintained at C/n.

By detecting the characteristic of the moving image file and adjusting the index densities in respective sections of which frequencies in use are estimated to vary from each other, it becomes possible to search for the correct position quickly without decreasing the positional accuracy more than necessary, even if the memory is minimum in size.

[Reproduction Start Point]

Figure 12:
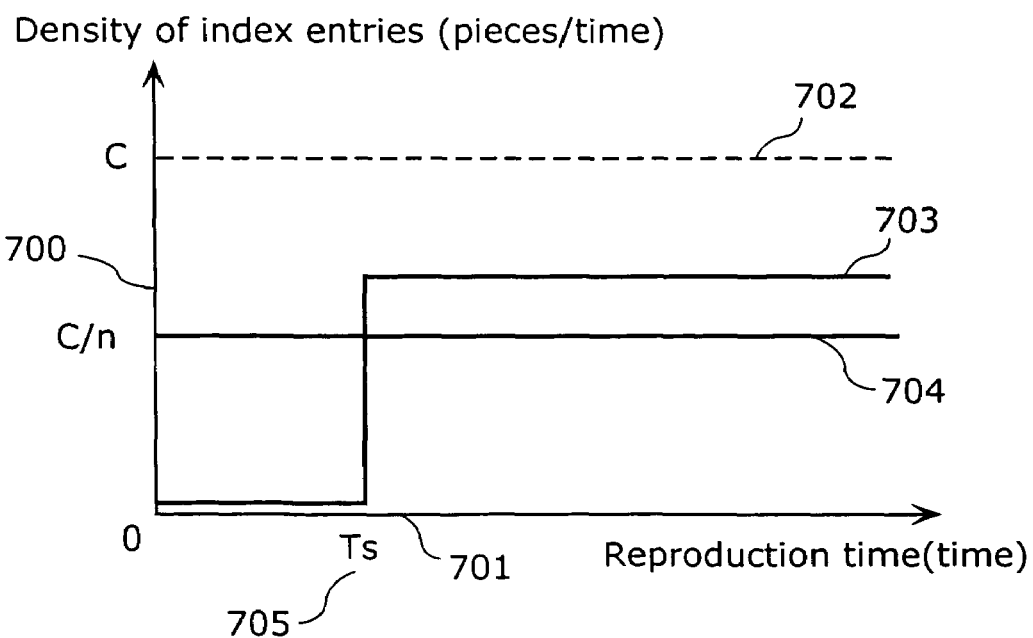
FIG. 12 is a diagram showing a state of index information in the case where it is thinned out based on a reproduction start point.

FIG. 12 is a diagram showing a state of index information in the case where it is thinned out based on the reproduction start point. To be more specific, FIG. 12 shows one example of the state in which the reproducing apparatus is reading the index information while thinning out the index information based on the weight assigned thereto depending on the reproduction start point of a moving image file, in the case where the reproduction is restarted from the reproduction point in the middle of the file. 700 denotes the density (pieces per time) of index entries, 701 denotes the reproduction time (time) of the moving image file, 702 denotes the density C of the index entries in the pre-thinned-out index information table, 703 denotes the distribution of the densities of the index entries which were thinned out based on the weights assigned thereto, 704 denotes the average value of the densities in the distribution indicated by 603, and 705 denotes the reproduction restart time Ts at which the user restarts the reproduction.

The operation of the optical disk reproducing apparatus structured as mentioned above is described below.

A DVD player has a function of reproducing a moving image file in the middle thereof. For example, it has a function of storing the position of the end of the previous reproduction and restarting the next reproduction from the stored position.

In the case where a user restarts the reproduction of a moving image file in the middle thereof as mentioned above, the user is likely to see the file from the point at which he left off reproducing the file, in general, while he is unlikely to reproduce the file prior to the point at which he left off reproducing the file. So, in the case where the reproduction start point detecting unit S108 detects the previous reproduction end point Ts705, the density of the index entries is set low before the timing of Ts705 because it is unlikely that the reproduction of the file is restarted at that timing, but the density of the index entries is set high at or after the timing of Ts705 because it is likely that the reproduction of the file is restarted at that timing. In this manner, by performing unique weight-based thinning-out of the index entries as indicated by 703, it becomes possible to increase the positional accuracy of the reproduction. In addition, by adjusting the thinning-out so that the value of 704 is maintained at C/n, it becomes possible to store all the post-thinned-out index entries into the working memory 506 of the reproducing apparatus.

By detecting the reproduction start point and changing the density of the index entries before and after the reproduction restart time 705 in this manner, it becomes possible to search for the position quickly without decreasing the positional accuracy more than necessary even if the memory size is minimum.

[Reproduction Mode]

Figure 13:
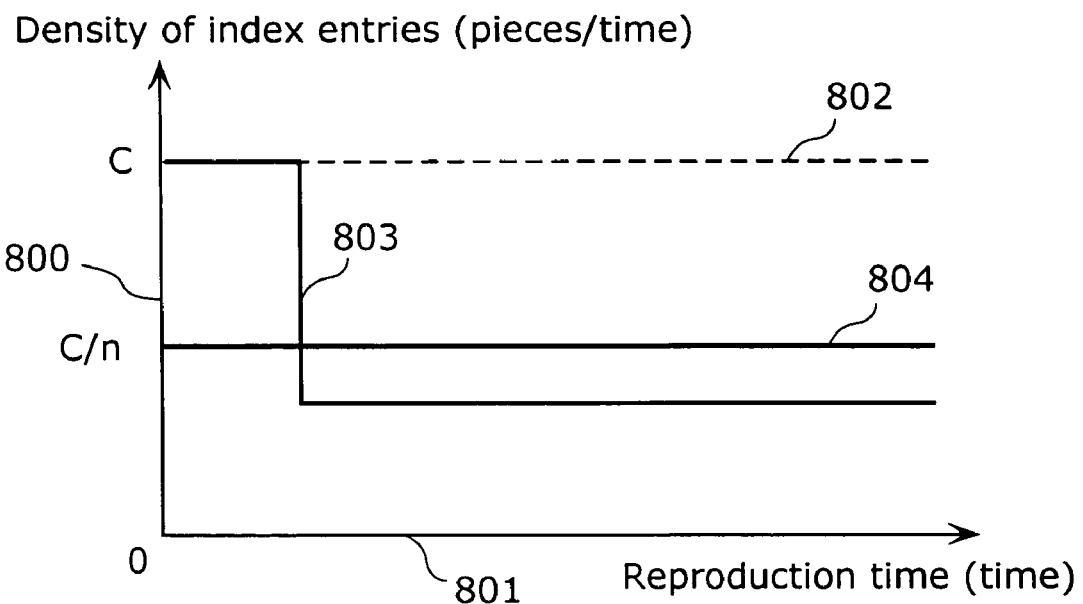
FIG. 13 is a diagram showing a state of index information in the case where it is thinned out based on a reproduction mode.

FIG. 13 is a diagram showing a state of index information in the case where it is thinned out based on the reproduction mode. To be more specific, FIG. 13 shows the state in which, in the case where a user selects an introduction reproduction function of searching for the beginning of a moving image file, the reproducing apparatus is reading index information while thinning out the index information based on the weight assigned thereto depending on this reproduction mode. 800 denotes the density (pieces per time) of index entries, 801 denotes the reproduction time (time) of the moving image file, 802 denotes the density C of the index entries in the pre-thinned-out index information table, 803 denotes the distribution of the densities of the index entries which were thinned out based on the weights assigned thereto, and 804 denotes the average value of the densities in the distribution indicated by 803.

As described above, in the case where the reproduction mode detecting unit S109 detects the introduction reproduction mode, the density of the index entries is set high during a section specific only to the beginning of a moving image file, namely, an introduction reproduction section, and therefore it becomes possible to thin out the index entries based on the weights assigned thereto as indicated by 803. In this case, by adjusting the thinning-out of the index entries so that the value of 804 is maintained at C/n, it becomes possible to store all the post-thinned-out index entries into the working memory 506 of the reproducing apparatus.

By changing the density of the index entries in a specific section based on the judgment of the reproduction mode, as described above, it becomes possible to search for the position quickly without decreasing the positional accuracy more than necessary even if the memory size is minimum.

[Operational Preference]

Figure 14:
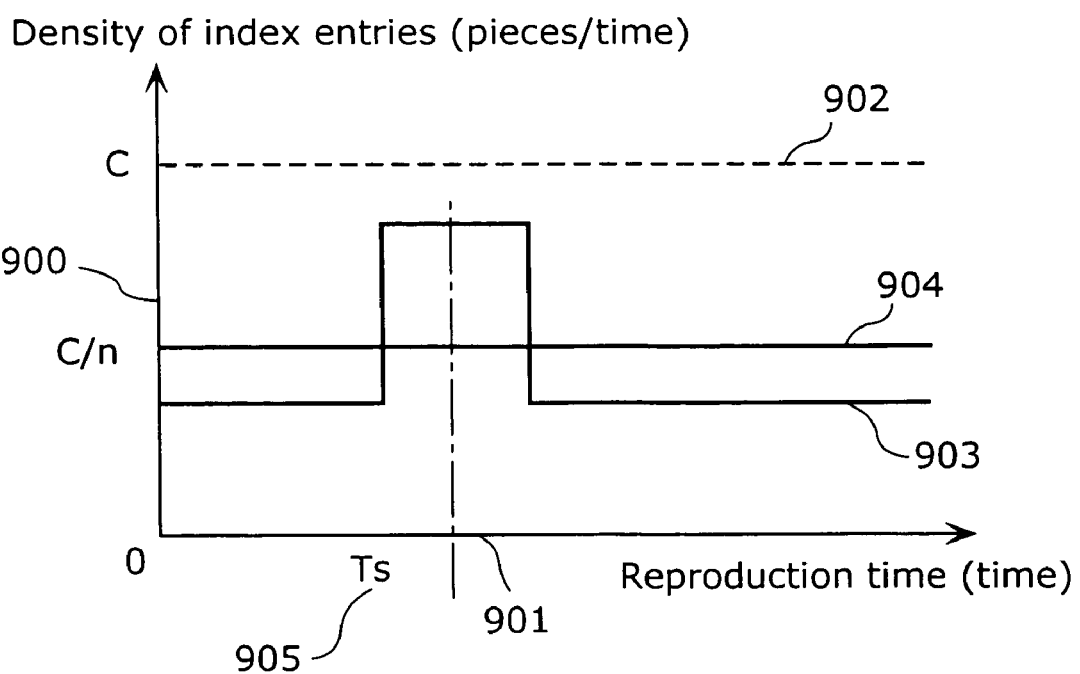
FIG. 14 is a diagram showing a state of index information in the case where it is thinned out based on a user's operational preference.

FIG. 14 is a diagram showing a state of index information in the case where it is thinned out based on a user's operational preference. To be more specific, FIG. 14 shows the state in which, in the case where a user frequently uses, immediately after the reproduction starts, a function of calling up the point several seconds before the current reproduction point by a single operation to restart the reproduction or a function of calling up the point several seconds after the current reproduction point by a single operation to restart the reproduction, the reproducing apparatus is reading index information while thinning out the index information based on the weight assigned thereto depending on such user's operational preference. 900 denotes the density (pieces per time) of index entries, 901 denotes the reproduction time (time) of the moving image file, 902 denotes the density C of the index entries in the pre-thinned-out index information table, 903 denotes the distribution of the densities of the index entries which were thinned out based on the weights assigned thereto, 904 denotes the average value of the densities in the distribution indicated by 903, and 905 denotes the reproduction restart time Ts at which the user restarts the reproduction.

In the case where, as described above, the operational preference detecting unit S110 detects that a user frequently uses a function of calling up the point several seconds before the current reproduction point by a single operation to restart the reproduction or a function of calling up the point several seconds after the current reproduction point by a single operation to restart the reproduction, the density of index entries is set high in the section before and after the reproduction restart time 905 in order to alleviate the operational discomfort as much as possible. This makes it possible to do the search with the high reproduction point accuracy being maintained, even if the above-mentioned function is frequently used immediately after the restart of the reproduction. By adjusting the thinning-out of the index entries so that the value of 904 is maintained at C/n, it also becomes possible to store all the post-thinned-out index entries into the working memory 506 of the reproducing apparatus.

As for the user's specific operation, by changing the weights assigned to the index entries based on the user's operational preference, as described above, it becomes possible to search for the position quickly without decreasing the positional accuracy more than necessary even if the memory size is minimum.

[Selection]

Figure 15:
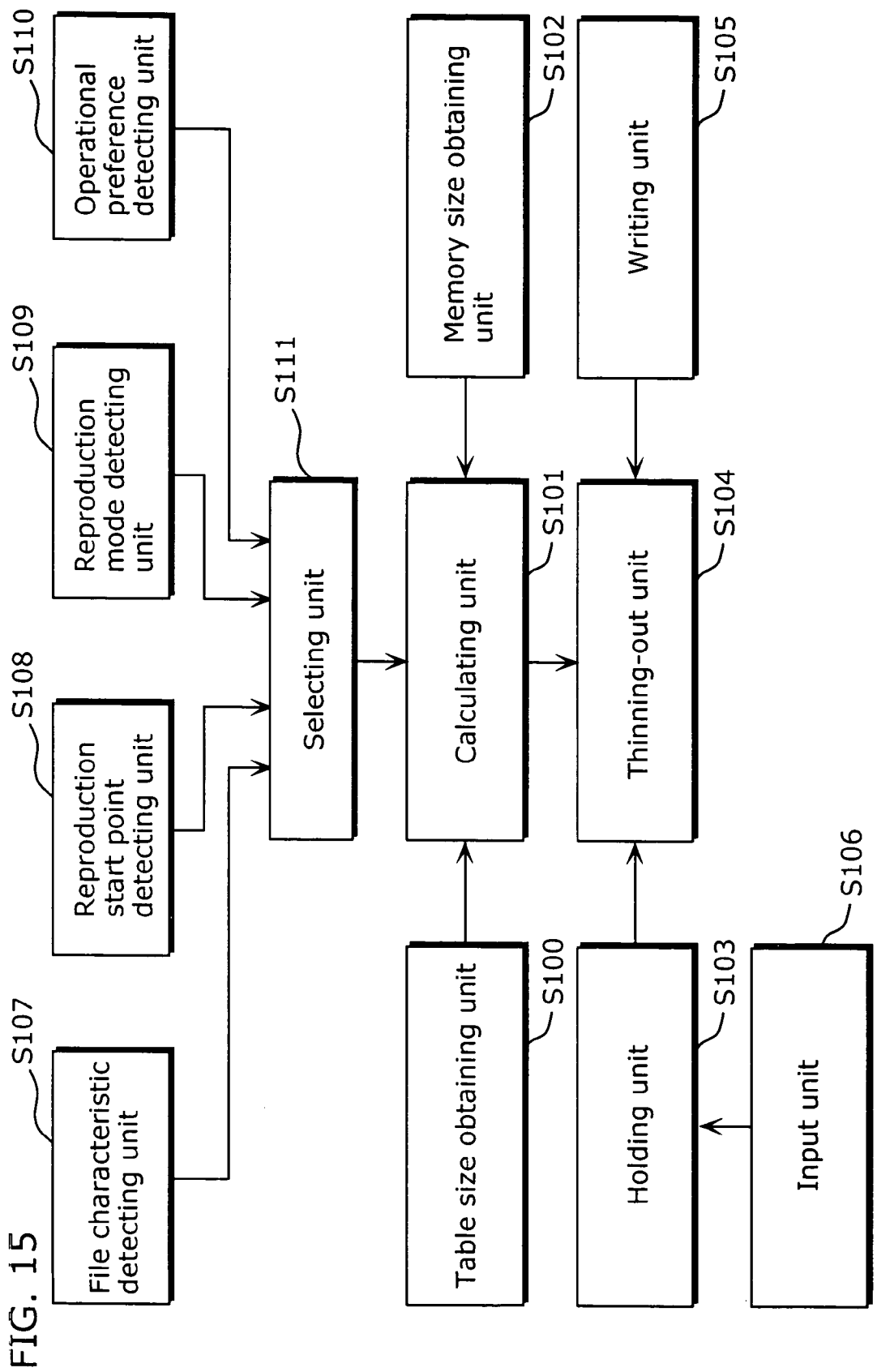
FIG. 15 is a functional block diagram of the main parts of another reproducing apparatus in the second embodiment.

FIG. 15 is a functional block diagram of the main parts of another reproducing apparatus in the second embodiment. As shown in FIG. 15, the reproducing apparatus may adopt a structure in which a selecting unit S111 is placed between the calculating unit S101 and each of the file characteristic detecting unit S107, the reproduction start point detecting unit S108, the reproduction mode detecting unit S109 and the operational preference detecting unit S110.

More specifically, upon receiving the instruction from the user, the selecting unit S11 selectively causes either one of the file characteristic detecting unit S107, the reproduction start point detecting unit S108, the reproduction mode detecting unit S109 and the operational preference detecting unit 5110 to operate. Therefore, the calculating unit S101 calculates the thinning-out ratio of index entries based not only the information obtained from the table size obtaining unit S100 and the memory size obtaining unit S102 but also on the information obtained from the selecting unit S111. It should be noted that a physical switch or the like may be used as the selecting unit S111.

According to the structure including the selecting unit S111 as described above, it becomes possible to easily select either one of the reproduction start point detecting unit S108, the reproduction mode detecting unit S109 and the operational preference detecting unit S110. In the case where the thinning-out ratio is calculated using the detection result obtained from two or more detecting units out of the above detecting units, the selecting unit S111 selects such two or more detecting units, as a matter of course.

As described above, since the index information is thinned out based on the weight assigned thereto in the second embodiment, it is possible not only to realize fast reproduction operation but also to minimize the decrease in the positional accuracy of the reproduction point caused by the thinning-out.

Third Embodiment

The structures for thinning out index information have been described in the first and second embodiments, but in the third embodiment, a structure for reproducing a moving image file using post-thinned-out index information will be described.

Figure 16:
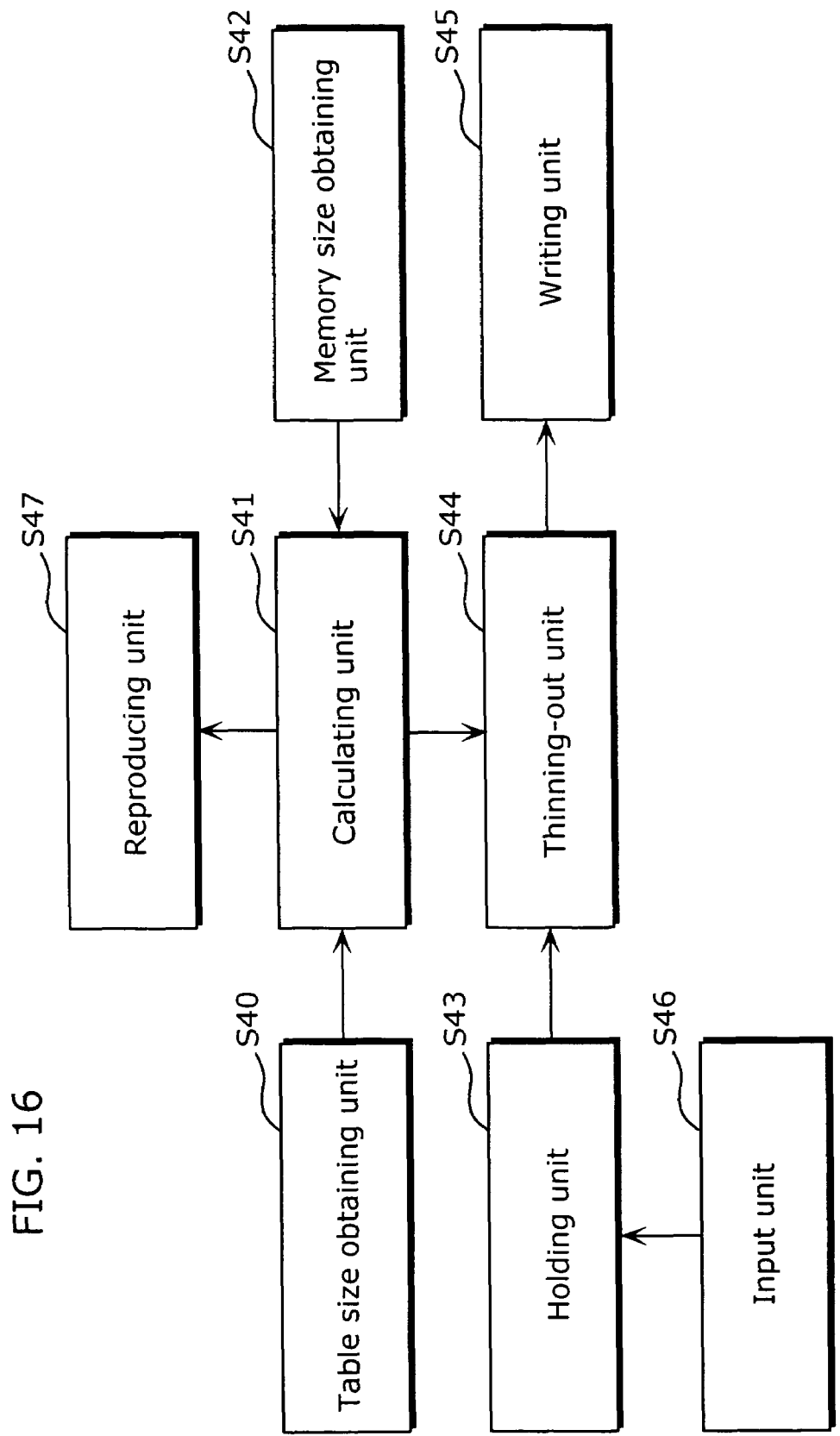
FIG. 16 is a functional block diagram of the main parts of a reproducing apparatus in a third embodiment.

FIG. 16 is a functional block diagram of the main parts of a reproducing apparatus in the third embodiment. The reproducing apparatus in the third embodiment is same as that in the first embodiment except that the former includes the reproducing unit S47 and the operation of the calculating unit S41 of the former is different from that of the latter. Here, the calculating unit S41 calculates the reproduction start point of a moving image file based on the thinning-out ratio. The reproducing unit S47 reproduces the moving image file from the reproduction start point calculated by the calculating unit S41.

Figure 17:
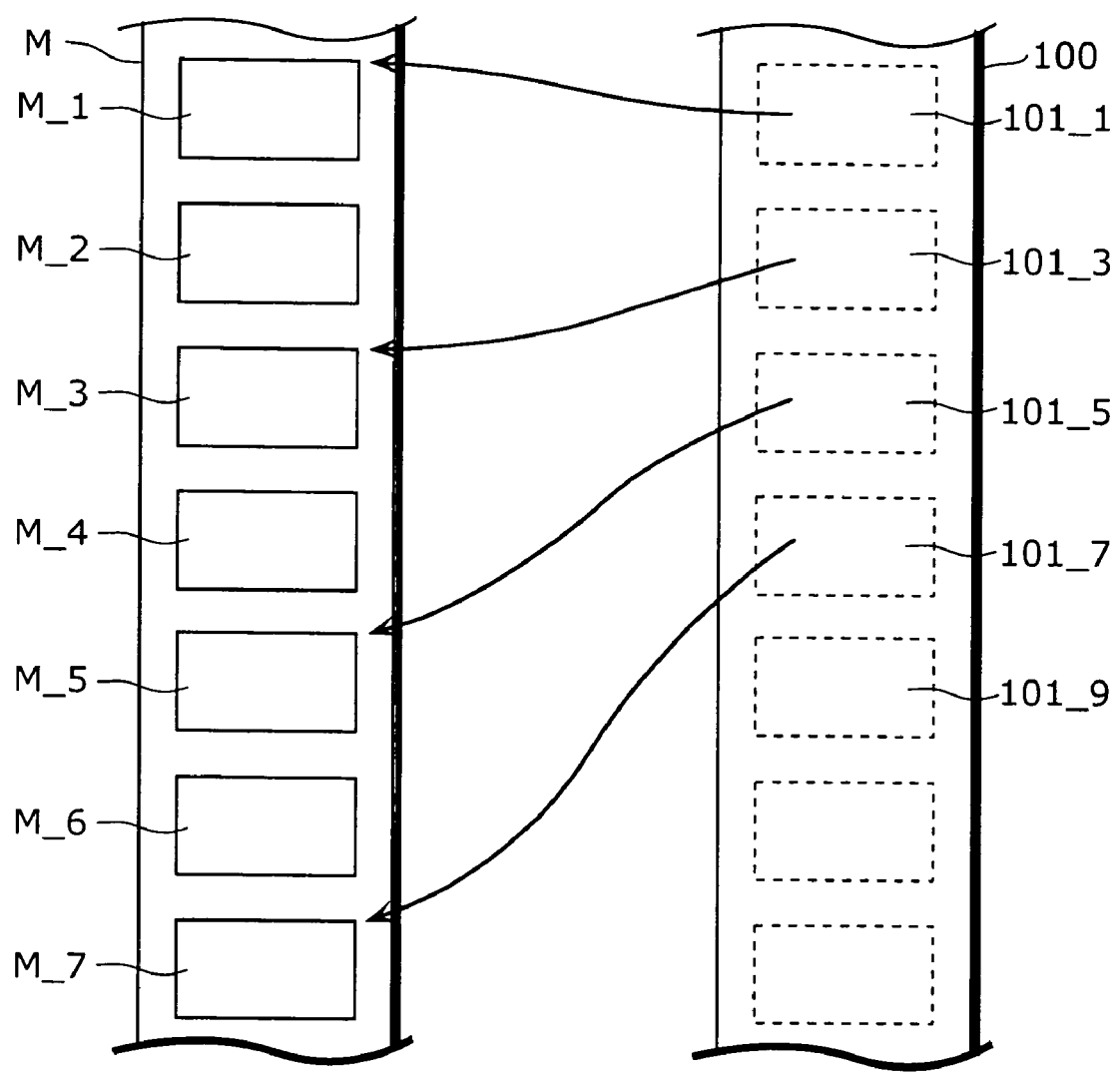
FIG. 17 is a diagram conceptually showing the reproduction operation of the reproducing apparatus to which the present invention is applied.

FIG. 17 is a diagram conceptually showing the reproduction operation of the reproducing apparatus to which the present invention is applied. Here, FIG. 17 shows the relation between the index information after being thinned out to one half (½) at regular intervals and the moving image file. More specifically, the chunk offset included in the index entry 101_1 represents the location of the chunk M_1 with the number of bytes from the beginning of the moving image file M. Similarly, the chunk offsets included in the index entries 101_3, 101_5 and 101_7 respectively represent the locations of the chunks M_3, M_5 and M_7 with the numbers of bytes from the beginning of the moving image file M.

Figure 18:
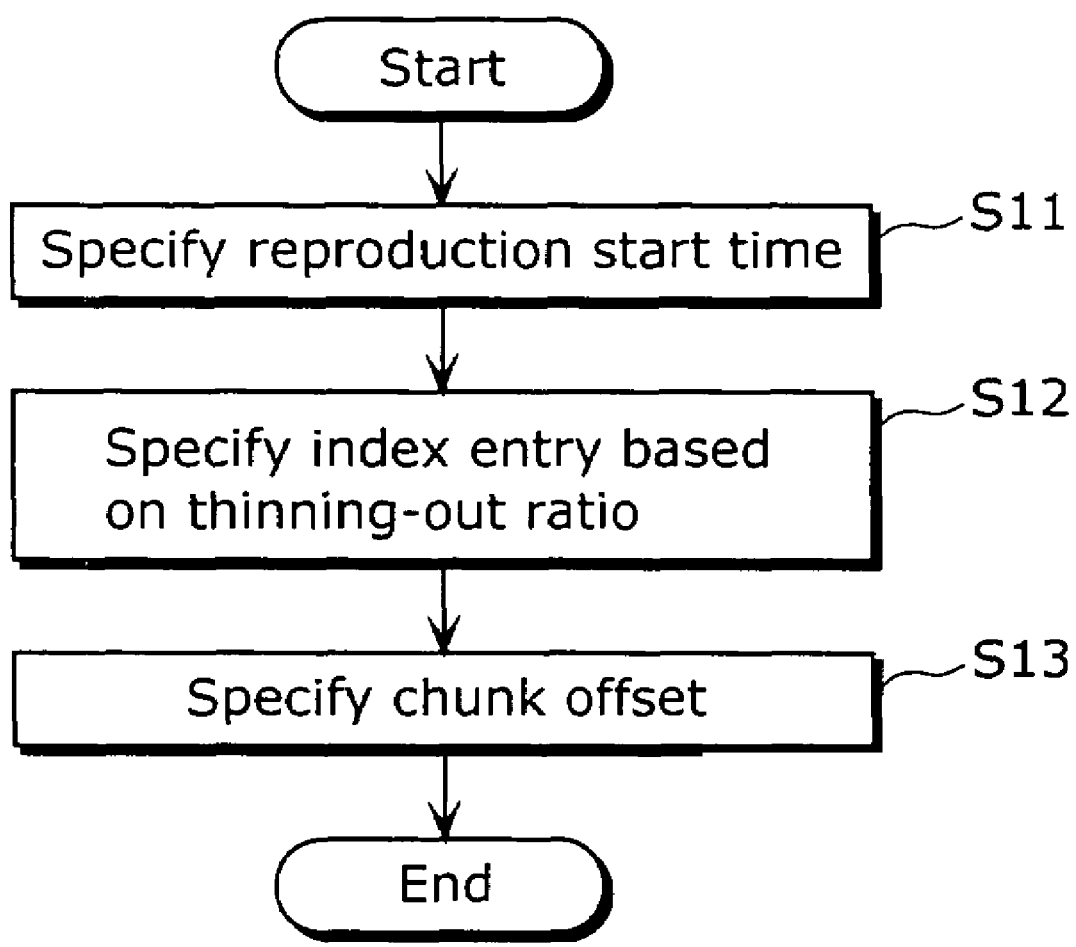
FIG. 18 is a flowchart showing the reproduction operation of the reproducing apparatus to which the present invention is applied.

FIG. 18 is a flowchart showing the reproduction operation of the reproducing apparatus to which the present invention is applied. As shown in FIG. 17, in the case where the user specifies the start of the reproduction of a moving image file from the point of reproduction time 1000 msec after the index information is thinned out at regular intervals (S11), the calculating unit S41 specifies the index entry based on the thinning-out ratio of ½ (S12). For example, as shown in FIG. 3, considering the case where the index entries are set at an interval of reproduction time 500 msec, the third index entry 101_5 from the beginning is specified if they are not thinned out. However, considering here that the index entries are thinned out to ½, the second index entry 101_3 from the beginning is specified.

Next, after specifying the index entry, the calculating unit S41 specifies the chunk offset that corresponds to this index entry (S13) and notifies the reproducing unit S47. Accordingly, the reproducing unit S47 starts the reproduction from the chunk specified by this chunk offset.

As described above, since the reproducing apparatus to which the present invention is applied is structured so as to specify the reproduction start point using the thinning-out ratio of index information even after it is thinned out, it is capable of reproducing the moving image file normally.

It should be noted that the case where the user specifies the start of the reproduction of a moving image file from the point of reproduction time 1000 msec has been described here, but the value obtained by dividing the reproduction time (for example, 1300 msec) of the moving image file specified by the user by the interval (for example, 500 msec) set for the index entries might not be an integer value. In such case, by specifying the earlier index entry (for example, the index entry 101_3) of the two index entries (for example, the index entries 101_3 and 101_5) and reproducing from the earlier one, it becomes possible to arrive at the specified reproduction start time (for example, 1300 msec) of the moving image file. In this case, if the display of the moving image file is not updated during a period from the location of the earlier index entry (for example, the index entry 101_3) to the specified reproduction start time (for example, 1300 msec), it looks to the user as if the reproduction has started from the specified reproduction start time (for example, 1300 msec).

In addition, it is assumed here that the calculating unit S41 performs the processing until the specification of a chunk offset, but the present invention is not limited to such case. For example, such structure may also be adopted, in which the index entry number is notified to the reproduction unit S47 after the calculating unit S41 specifies the index entry so that the reproducing unit S47 can specify the chunk offset, and in such case, the same advantage as described above can be obtained.

The present invention can be applied to a DVD player and the like which need to reproduce a moving image file using index information of larger size than a memory size, without re-reading the index information into the memory.

The invention claimed is:

1. A reproducing apparatus which reproduces a moving image file recorded on a recording medium, the apparatus comprising:
   a memory for storing index information that is for the reproduction of the moving image file;
   a memory size obtaining unit operable to obtain size information of the memory;
   a table size obtaining unit operable to obtain, from the recording medium, size information of a table that holds the index information that is for the reproduction of the moving image file;
   a calculating unit operable to calculate a thinning-out ratio of the index information to be stored in the memory, the thinning-out ratio being calculated based on the size information of the memory and the size information of the table; and
   a writing unit operable to thin out the index information read from the recording medium, the index information being thinned out based on the thinning-out ratio calculated by the calculating unit, and operable to write the thinned-out index information into the memory.

2. The reproducing apparatus according to claim 1, wherein the calculating unit calculates the thinning-out ratio of the index information such that the index information is thinned out based on a weight assigned to the index information according to a reproduction time of the moving image file.

3. The reproducing apparatus according to claim 2, further comprising a file characteristic detecting unit operable to detect a characteristic of the moving image file,
   wherein, when the file characteristic detecting unit detects that contents of the moving image file is a movie, the calculating unit calculates the thinning-out ratio of the index information such that a density of the index information becomes lower as the reproduction time of the moving image file passes.

4. The reproducing apparatus according to claim 2, further comprising a reproduction start point detecting unit operable to detect a reproduction start point of the moving image file,
   wherein the calculating unit calculates the thinning-out ratio of the index information such that a density of the index information becomes lower before the reproduction start point detected by the reproduction start point detecting unit, and the density of the index information becomes higher after the reproduction start point detected by the reproduction start point detecting unit.

5. The reproducing apparatus according to claim 2, further comprising a reproduction mode detecting unit operable to detect a reproduction mode of the moving image file,
   wherein, when the reproduction mode detecting unit detects an introduction reproduction mode for searching for a beginning of the moving image file, the calculating unit calculates the thinning-out ratio of the index information such that a density of the index information becomes higher in an introduction reproduction section, and the density of the index information becomes lower in a section other than the introduction reproduction section.

6. The reproducing apparatus according to claim 2, further comprising an operational preference detecting unit operable to detect an operational preference of a user,
   wherein, when the operational preference detecting unit detects that the user uses a specific reproduction function at a predetermined frequency or higher, the calculating unit calculates the thinning-out ratio of the index information such that a density of the index information becomes higher in a reproduction section that is required when the specific reproduction function is used, and the density of the index information becomes lower in a reproduction section that is not required when the specific reproduction function is used.

7. A reproducing method for reproducing a moving image file recorded on a recording medium, the reproducing method comprising:

a memory size obtaining step of obtaining size information of a memory for storing index information that is for the reproduction of the moving image file;

a table size obtaining step of obtaining, from the recording medium, size information of a table that holds index information that is for the reproduction of the moving image file;

a calculating step of calculating a thinning-out ratio of the index information to be stored in the memory, the thinning-out ration being calculated based on the size information of the memory and the size information of the table; and a writing step of thinning out the index information read from the recording medium, the index information being thinned out based on the thinning-out ration calculated by the calculating step, and writing the thinned-out index information into the memory.

8. A non transitory computer-readable medium having a program recorded thereon, the program for reproducing a moving image file recorded on a recording medium, and the program causing a computer to execute a method comprising:

a memory size obtaining step of obtaining size information of a memory for storing index information that is for the reproduction of the moving image file;

a table size obtaining step of obtaining, from the recording medium, size information of a table that holds index information that is for the reproduction of the moving image file;

a calculating step of calculating a thinning-out ratio of the index information to be stored in the memory, the thinning-out ratio being calculated based on the size information of the memory and the size information of the table; and a writing step of thinning out the index information read from the recording medium, the index information being thinned out based on the thinning-out ratio calculated by the calculating step, and writing the thinned-out index information into the memory.

* * * * *